(12) United States Patent
Schmidt

(10) Patent No.: US 12,313,175 B1
(45) Date of Patent: May 27, 2025

(54) FLOAT VALVE WITH A PROTECTIVE SPRING

(71) Applicant: Citadel Casing Solutions, LLC, Houston, TX (US)

(72) Inventor: Daniel L Schmidt, Magnolia, TX (US)

(73) Assignee: Citadel Casing Solutions LLC, Houston, TX (US)

( * ) Notice: Subject to any disclaimer, the term of this patent is extended or adjusted under 35 U.S.C. 154(b) by 0 days.

(21) Appl. No.: 18/299,696

(22) Filed: Apr. 12, 2023

(51) Int. Cl.
  F16K 15/06  (2006.01)
  F16K 15/02  (2006.01)
  F16K 27/02  (2006.01)
  F16K 1/12   (2006.01)

(52) U.S. Cl.
  CPC ........ F16K 27/0209 (2013.01); F16K 15/026 (2013.01); F16K 15/065 (2021.08); F16K 1/126 (2013.01); F16K 2200/303 (2021.08)

(58) Field of Classification Search
  CPC .. F16K 15/065; F16K 27/0209; F16K 15/063; F16K 15/067
  See application file for complete search history.

(56) References Cited

U.S. PATENT DOCUMENTS

| | | | | |
|---|---|---|---|---|
| 1,630,666 | A * | 5/1927 | McEvoy, Jr. ......... | F16K 15/065 166/158 |
| 2,182,278 | A * | 12/1939 | Brauer ................... | E21B 21/10 137/902 |
| 4,765,364 | A * | 8/1988 | Arcari ................... | F16K 15/065 137/542 |
| 5,465,751 | A * | 11/1995 | Newton ................. | F16K 17/30 137/498 |
| 8,485,801 | B2 * | 7/2013 | Mohamed .............. | F01L 3/085 137/512.1 |
| 11,408,522 | B1 * | 8/2022 | Stair ..................... | F16K 15/026 |

FOREIGN PATENT DOCUMENTS

| | | | | |
|---|---|---|---|---|
| CN | 109990123 A | * | 7/2019 | |
| GB | 2076506 A | * | 12/1981 | .......... F16K 15/063 |
| KR | 102206752 B1 | * | 1/2021 | |
| WO | 2023072359 A2 | | 5/2023 | |

OTHER PUBLICATIONS

Machine English translation of KR102206752 (Year: 2024).*
Machine English translation of CN109990123A (Year: 2024).*

* cited by examiner

*Primary Examiner* — Hailey K. Do
(74) *Attorney, Agent, or Firm* — AVEK IP, LLC

(57) ABSTRACT

A valve includes a valve housing defining a fluid flow passage, a valve seat extending into the fluid flow passage, a valve poppet mechanically coupled to a valve stem, the poppet engages and disengages with the valve seat, a spring extending around a portion of a periphery of the valve stem, the spring extends and contracts to close and open the fluid flow passage, the valve stem having a spring abutting surface, a pocket positioned within the fluid flow passage and having a body extending from a closed end to an open end; the spring extends through the open end when in an extended state, and when the spring is in a contracted position, the open end of the pocket abuts with the spring abutting surface of the valve stem to seal the spring within the pocket.

9 Claims, 4 Drawing Sheets

FLOAT VALVE WITH A PROTECTIVE SPRING

FIELD OF THE DISCLOSURE

The disclosure relates generally to the field of valves. More specifically, the disclosure relates to a float valve with a pocket for protecting a spring from erosion and debris during fluid flow through the valve.

BRIEF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In some aspects, the present invention includes a float valve having a valve housing defining a fluid flow passage therethrough, a valve seat extending into the fluid flow passage, a valve poppet mechanically coupled to a valve stem, the valve poppet engages and disengages with the valve seat to close and open the fluid flow passage. A spring extending around a portion of a periphery of the valve stem, the spring extends and contracts to close and open the fluid flow passage. The valve stem has a spring abutting surface. A pocket positioned within the fluid flow passage, the pocket having a body extending from a closed end to an open end, wherein the spring extends through the open end when in an extended state, and wherein, while the spring is in a contracted position, the open end of the pocket abuts with the spring abutting surface of the valve stem to enclose the spring within the pocket.

BRIEF DESCRIPTION OF THE SEVERAL VIEWS OF THE DRAWINGS

Illustrative embodiments of the present disclosure are described in detail below with reference to the attached drawing figures.

Figure 1:
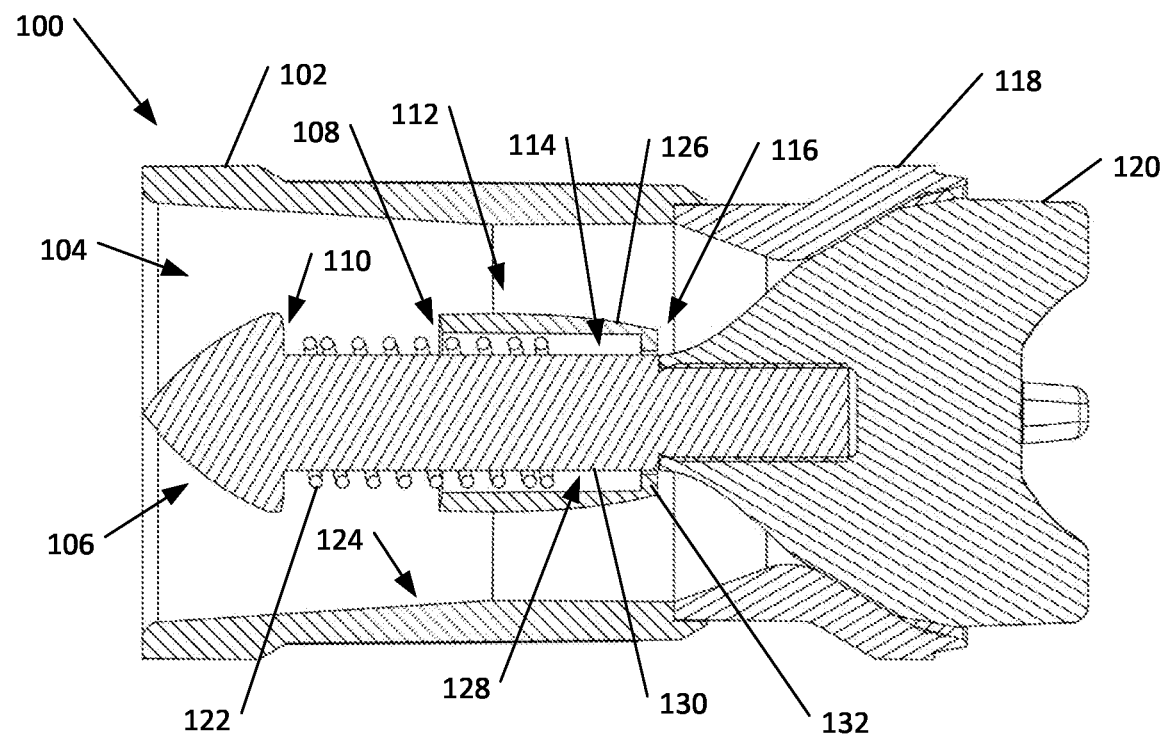
FIG. 1 is a side, cross-sectional view of a float valve in a closed position in accordance with the present invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Float valves are well known in the art and are commonly used in industries such as the oil and gas industry. These valves are an effective means to permit fluid to flow or pressure to act in one direction by using tension to open and close a fluid flow pathway through the valve. Tension is conventionally achieved by use of a spring coupled to a valve stem which is further mechanically coupled to a poppet. The combination of elements in the valve allows for the valve to open and close to allow fluid to flow therethrough, however, one common problem is fluid caused erosion on the spring, which can reduce the lifespan and/or effectiveness of the valve. In addition, it is common for debris to become lodged within the spring, again reducing the lifespan or effectiveness of the valve. Accordingly, the present invention provides for a pocket within a valve housing, wherein the pocket is situated to enclose the spring when the spring is in a contracted state. The pocket helps protect the spring from coming into contact with fluid flowing through the valve, and therefore extends the life of the spring and the valve itself by reducing erosion on the spring.

Figure 2:
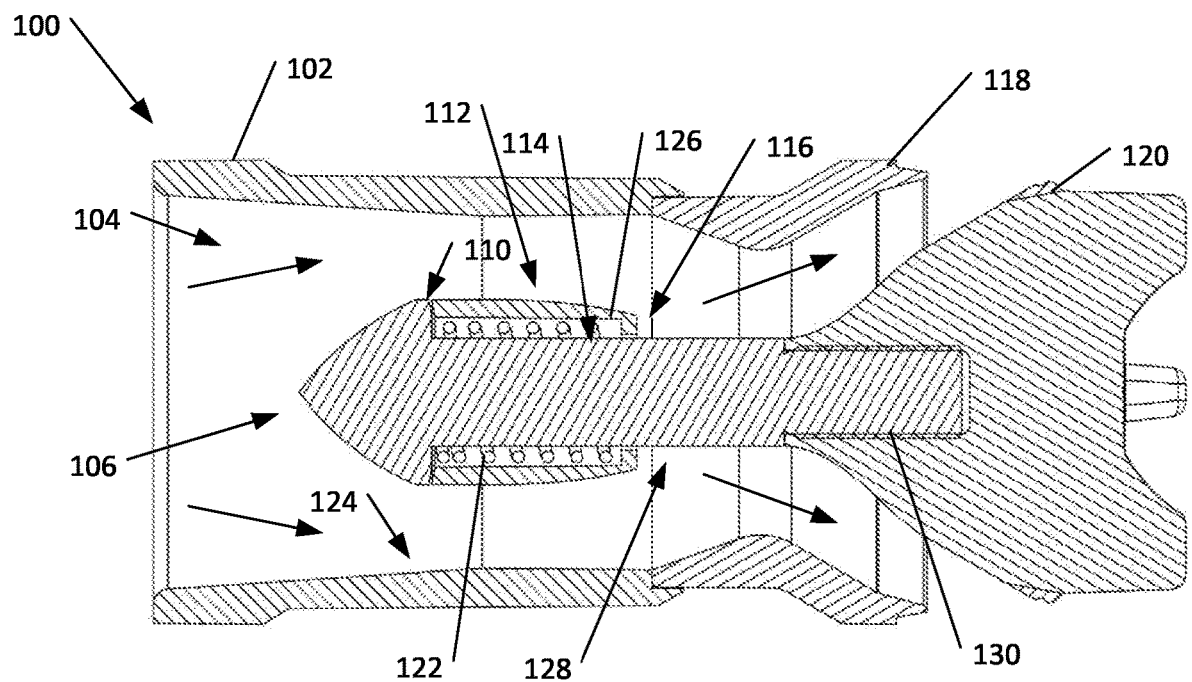
FIG. 2 is a side, cross-sectional view of the float valve of FIG. 1 in an open position.

In FIGS. 1 and 2, cross-sectional views of a valve 100 are shown. Valve 100 includes a valve housing 102 defining a fluid flow passage 104 therethrough. The valve housing 102 may vary as would be understood by those skilled in the art and can include conventional and known components to create operation as a valve. In embodiments, the valve is a float valve, however, those skilled in the art will appreciate that the mechanisms described herein may apply to various types of valves. Within the fluid flow passage 104 are valve components for opening and closing the fluid flow passage 104. These components include at least a valve stem 106 which includes an elongated stem body 130 mechanically coupled to a poppet 120. The poppet 120 is sized and shaped appropriately to engage with a valve seat 118. Again, those skilled in the art will understand that the poppet 120 and seat 118 may vary based on valve design and/or model without departing from the overall functionality of the present invention. The valve seat 118 may be integral or otherwise engaged with the valve housing 102 such that the seat 118 extends partially into the fluid flow passage 104 to provide a surface to engage with the poppet 120 to thereby open and close the fluid flow passage 104.

The valve stem 106 further includes a spring abutting surface 110 which may be an area of larger diameter than the stem body 130. The spring abutting surface 110 is configured to engage with a spring 122 to compress the spring 122 (shown in FIG. 2). Compression of the spring 122 is caused by the act of pumping fluid through the valve 100 and further applies pressure or force to the poppet 120 through the coupling to the stem body 130 which disengages the poppet 120 from the seat 118, thereby opening the fluid flow passage 104. When the fluid flow passage 104 is open, fluid can freely flow therethrough, as shown with the arrows in FIG. 2.

One of the unique features of the present invention is a pocket 114 for protection of the spring 122. The pocket 114 is formed by a pocket body 126 positioned within the fluid flow passage 104. The pocket body 126 extends from an open end 108 to a closed end 116. As shown, the spring 122 extends and contracts through the open end 108. The closed end 116 seals off the spring 122 with the stem body 130. In other words, the pocket body 126 engages with an exterior surface 128 of the stem body 130 to create the closed end 116. This may be achieved by the pocket body 126 including a lip 132 extending inward and coming into contact with the stem body 130.

As shown best in FIGS. 1 and 2, when the spring 122 is in an extended state (FIG. 1), the fluid flow passage 104 is closed and the spring is exposed. However, when the spring 122 is contracted (FIG. 2), based on pumping fluid through the valve 100, the spring 122 is pushed into the pocket 114 and the spring abutting surface 110 comes into contact with the open end 108 of the pocket body 126 thereby closing off the open end 108 and enclosing the spring 122 within the pocket 114. In this configuration, the fluid flow passage 104 is open and fluid flows around the pocket body 126, wherein the spring 122 is protected from the fluid flow. The pocket 114 helps prevent erosion of the spring 114 and blocks debris from becoming lodged in the spring 114, which prolongs the lifespan and effectiveness of the valve 100.

Figure 3:
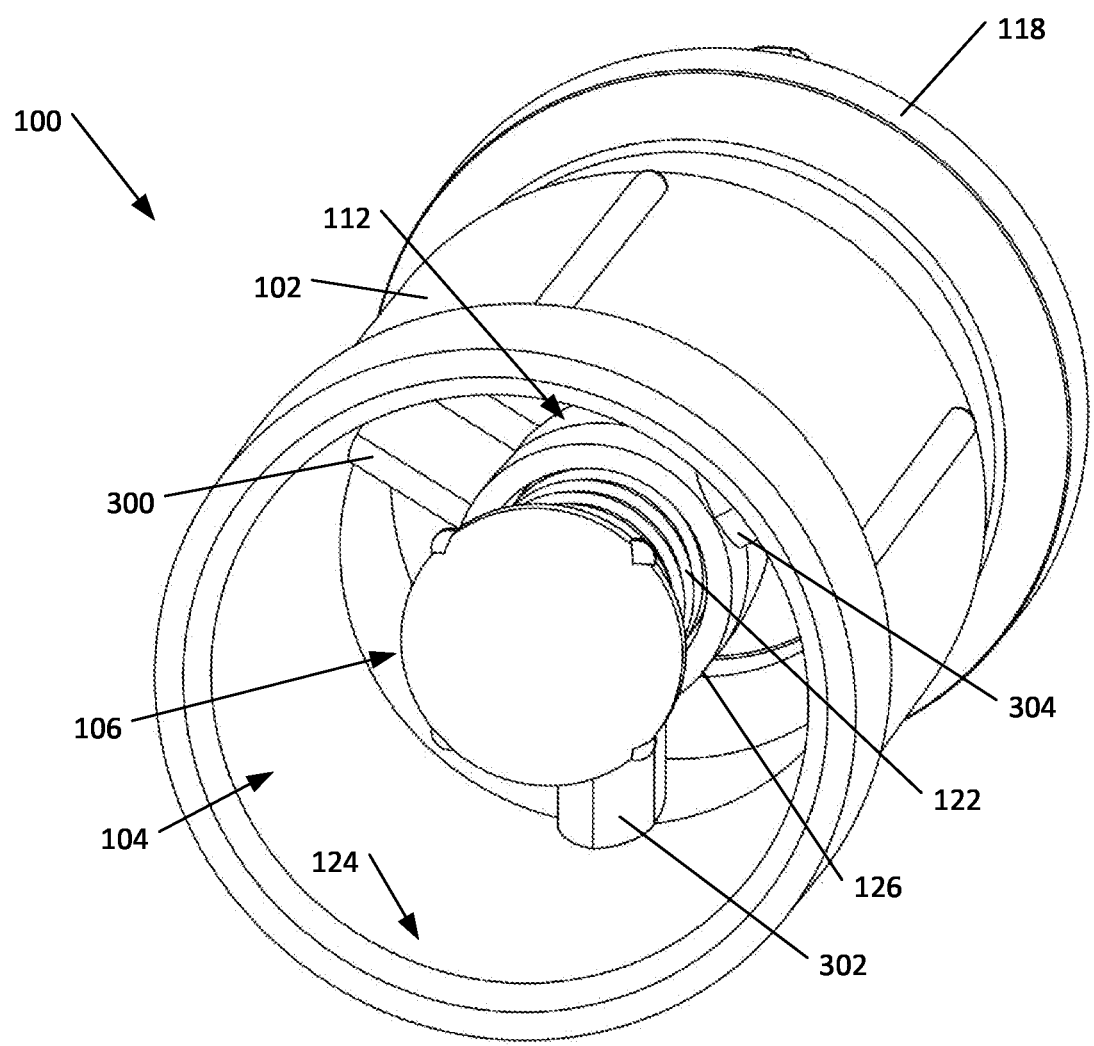
FIG. 3 is an angled, end view of the float valve of FIG. 1 in a closed position.
Figure 4:
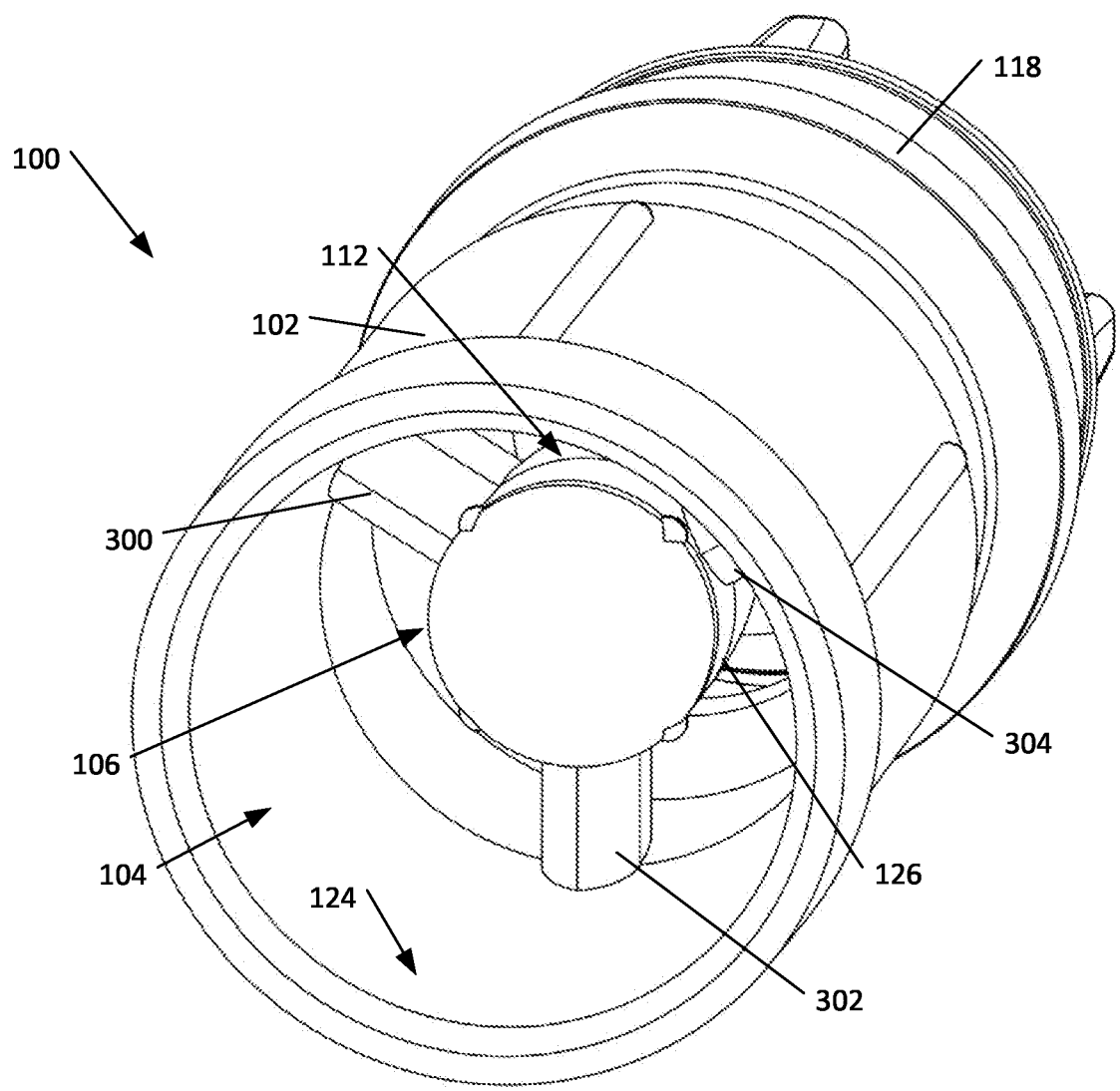
FIG. 4 is an angled, end view of the float valve of FIG. 1 in an open position.

As best shown in FIGS. 3 and 4, the pocket 114 is mounted within the valve housing 102 by one or more supports 300, 302, 304. In embodiments, the one or more supports 300, 302, 304 are structural walls that extend from an interior surface 124 of the valve housing 102 and to an exterior surface 112 of the pocket body 126. In embodiments, three supports are used, however, it is contemplated that more or fewer supports may be added so long as they are secured so as to create minimal fluid flow resistance. The supports 300, 302, 304 ensure that the pocket 114 remains stationary relative to the movement of the valve stem 106 and spring 122. As would be understood by those skilled in the art, the pocket 114 may vary in size and/or materials as needed for fitting to various valve designs and models.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

The invention claimed is:

1. A valve, comprising:
    a valve housing extending from a first end to a second end and defining a fluid flow passage therethrough;
    a valve seat extending into the fluid flow passage near the second end;
    a valve poppet mechanically coupled to a valve stem, the valve poppet engages and disengages with the valve seat to close and open the fluid flow passage;
    a spring extending around a portion of a periphery of the valve stem, the spring extends and contracts to close and open the fluid flow passage;
    the valve stem having a spring abutting surface;
    a pocket positioned within the fluid flow passage, the pocket having:
        a body extending from a closed end to an open end;
    wherein the spring extends through the open end when in an extended state;
    wherein, while the spring is in a contracted position, the open end of the pocket abuts with the spring abutting surface of the valve stem to enclose the spring within the pocket, the spring being fully enclosed within the pocket and protected from fluid flow only when the fluid flow passage is fully open; and
    wherein the fluid flow passage extends from the first end of the valve housing and to the second end of the valve housing such that when the fluid flow passage is in an open configuration, fluid will flow over an entire length of the valve stem to exert force against the valve poppet.

2. The valve of claim 1, wherein fluid flow through the valve opens the valve and encloses the spring within the pocket and fluid flows around the pocket and does not come into contact with the spring.

3. The valve of claim 1, wherein the pocket further comprises a lip extending from the body to an exterior surface of the valve stem to create the closed end.

4. The valve of claim 1, further comprising:
    one or more supports extending inward from an interior wall of the valve housing and engaged with an exterior wall of the body, thereby supporting the pocket within the fluid flow passage.

5. The valve of claim 4, wherein the one or more supports are three evenly spaced supports.

6. A valve, comprising:
    a valve housing extending from a first end to a second end and defining a fluid flow passage therethrough;
    a valve stem positioned within the valve housing, the valve stem operates to open the valve based on fluid flow;
    a spring extending around a portion of a periphery of the valve stem, the spring extends and contracts based on pressure applied to the spring by the valve stem, the pressure created by the fluid flow;
    a pocket positioned within the fluid flow passage, the pocket having:
        a body extending from a closed end to an open end;
    wherein the spring extends through the open end when in an extended state;
    wherein, while the spring is in a contracted position, the open end of the pocket abuts with a spring abutting surface of the valve stem to enclose the spring within the pocket, the spring being fully enclosed within the pocket and protected from fluid flow only when the fluid flow passage is fully open;
    wherein the fluid flow passage extends from the first end of the valve housing and to the second end of the valve housing such that when the fluid flow passage is in an open configuration, fluid will flow over an entire length of the valve stem such that force is exerted on the spring via the stem; and
    wherein when the spring is fully enclosed within the pocket, fluid flows around the pocket and does not come into contact with the spring.

7. The valve of claim 6, wherein the pocket further comprises a lip extending from the body to an exterior surface of the valve stem to create the closed end.

8. The valve of claim 6, further comprising:
one or more supports extending inward from an interior wall of the valve housing and engaged with an exterior wall of the body, thereby supporting the pocket within the fluid flow passage.

9. The valve of claim 8, wherein the one or more supports are three evenly spaced supports.

\* \* \* \* \*